United States Patent
Hanyu (10) Patent No.: US 6,816,179 B2
(45) Date of Patent: Nov. 9, 2004

(54) COLOR PRINTING APPARATUS THAT REDUCES TONER AMOUNT

(75) Inventor: Hitomi Hanyu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/224,340

(22) Filed: Aug. 21, 2002

(65) Prior Publication Data

US 2003/0047099 A1 Mar. 13, 2003

(30) Foreign Application Priority Data

Aug. 23, 2001 (JP) ........................................ 2001-253123

(51) Int. Cl.$^7$ ................................ B41J 2/39; G03F 3/08
(52) U.S. Cl. ....................... 347/131; 347/115; 358/1.9; 358/1.13; 358/519; 358/520; 358/518
(58) Field of Search ................................ 347/131, 115; 358/1.9, 1.13, 518–520

(56) References Cited

U.S. PATENT DOCUMENTS

| | | |
|---|---|---|
| 5,325,474 A | 6/1994 | Kumazaki et al. |
| 5,357,583 A | 10/1994 | Sato et al. |
| 5,404,431 A | 4/1995 | Kumazaki et al. |
| 5,555,360 A | 9/1996 | Kumazaki et al. |
| 5,579,450 A | 11/1996 | Hanyu et al. |
| 5,697,712 A | 12/1997 | Sato et al. |
| 6,313,925 B1 * | 11/2001 | Decker et al. ............... 358/1.9 |

* cited by examiner

*Primary Examiner*—Eugene H. Eickholt
(74) *Attorney, Agent, or Firm*—Dickstein Shapiro Morin & Oshinsky LLP (57) ABSTRACT

An apparatus for printing a color image includes a printer driver which processes input image data to generate printable image data, and further includes one or more color profiles which are used by the printer driver to perform color matching on the input image data in a normal mode, wherein the printer driver uses one or more toner-saving-purpose profiles to perform color matching on the input image data in a toner saving mode, the one or more toner-saving-purpose profiles being specifically designed to reduce a toner amount on a printed color image.

22 Claims, 12 Drawing Sheets

< HEADER >
  PROFILE SIZE
  DATE AND TIME OF MAKING
  TYPE OF COLOR SPACE
  TAG OFFSET

< TAG >
  WHITE POINT TAG
  COLOR CONVERSION TAG
  INVERSE CONVERSION TAG
  COPYRIGHT TAG
  COLOR REPRODUCTION AREA TAG

FIG.3B

COLOR CONVERSION TAG

MATRIX
INPUT GAMMA TABLE (EACH COLOR)
COLOR CONVERSION LUT
OUTPUT GAMMA TABLE (EACH COLOR)

PRESET SETTING = "DTP DOCUMENT"

| OBJECT | CHARACTER | GRAPHICS | IMAGE |
| --- | --- | --- | --- |
| COLOR MATCHING | BUSINESS | BUSINESS | PHOTOGRAPHIC |
| DITHER | TEXT | PHOTOGRAPHIC | PHOTOGRAPHIC |
| .. | .. | .. | .. |

FIG.9B

PRESET SETTING = "DTP DOCUMENT (TONER SAVING)"

| OBJECT | CHARACTER | GRAPHICS | IMAGE |
| --- | --- | --- | --- |
| COLOR MATCHING | BUSINESS | BUSINESS | *TONER SAVING 1* |
| DITHER | TEXT | PHOTOGRAPHIC | PHOTOGRAPHIC |
| .. | .. | .. | .. |

COLOR PRINTING APPARATUS THAT REDUCES TONER AMOUNT

BACKGROUND OF THE INVENTION

1. Field of the Invention

The present invention generally relates to color printer apparatuses, and particularly relates to a color printer apparatus which prints documents with a reduced toner amount where each document may include characters, graphics, and images simultaneously.

2. Description of the Related Art

Application software of today is generally provided with a function to generate a color document by capturing color images, characters, graphics, etc. Even if the most part of this document image is comprised of black letters, the inclusion of color graphics or color images in the document results in an increase of color toners. The related-art color printer apparatuses may thus be provided with a particular design consideration such as to skip print dots by use of a mask pattern, thereby reducing toner amounts applied to the printed document image.

As an example of such apparatus, Japanese Patent Laid-open Application No. 11-112789 teaches purging data at every other pixel in the bitmap image data representing a document image, and prints the document image by use of the partially purged image data. Since image data is not printed at the purged pixels, such printing reduces the number of actually printed pixels, thereby decreasing toner amounts.

Japanese Patent Laid-open Application No. 2001-130055 teaches a printing method in which a mode can be selected from a plurality of modes including a toner saving mode, a high picture quality mode, and so on. Even when a current setting indicates the toner saving mode, a request by a user for use of high picture quality automatically results in switching from the toner saving mode to the high picture quality mode.

In the related-art technologies as described above, toner is saved (i.e., the toner amount is reduced) over the entire image that is printed. The printed image thus results in its entire appearance being in faint color. When a print image is to be reproduced from a captured color document that includes letters, graphics, and images as previously described, some part of the printed image may need less toner amount while other part of the printed image may need a clear image appearance The related-art technologies described above are not suited to such discriminatory toner saving. It is possible to add a new control stage to existing printing control stages so as to achieve discriminatory toner saving for different parts of the image Such addition of a control stage, however, results in the processing speed being undesirably reduced, compared with the print systems that do not have such additional control step.

Accordingly, there is a need for a color printing apparatus that achieves toner saving without reducing the processing speed of color printing.

There is another need for a color printing apparatus that achieves discriminatory toner saving for different image parts without reducing the processing speed of color printing.

SUMMARY OF THE INVENTION

It is a general object of the present invention to provide a color printing apparatus that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a color printing apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides an apparatus for printing a color image, including a printer driver which processes input image data to generate printable image data, and further including one or more color profiles which are used by the printer driver to perform color matching on the input image data in a normal mode, wherein the printer driver uses one or more toner-saving-purpose profiles to perform color matching on the input image data in a toner saving mode, the one or more toner-saving-purpose profiles being specifically designed to reduce a toner amount on a printed color image.

In the invention as described above, the printer driver operating in the toner saving mode applies the color matching process to the input image data by using the one or more toner-saving-purpose profiles. In this manner, the toner saving process is performed as part of the color matching process, without sacrificing the processing speed as in the related-art case where the toner-saving process step needs to be added to existing process steps.

According to one aspect of the present invention, the printer driver as described above includes an object identifying unit which identifies a type of an object included in the input image data, wherein the printer driver selects one of the color profiles that matches the identified type of the object so as to use the selected color profile to perform the color matching in the normal mode, and selects one of the toner-saving-purpose profiles that matches the identified type of the object so as to use the selected toner-saving-purpose profile to perform the color matching in the toner saving mode.

The invention described above makes it possible to achieve discriminatory toner saving for different image parts (i.e., image objects of different types) without reducing the processing speed of color printing. Namely, toner saving can be achieved with respect to only a selected portion of the print image while maintaining high image quality for portions that require high quality printing.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1:
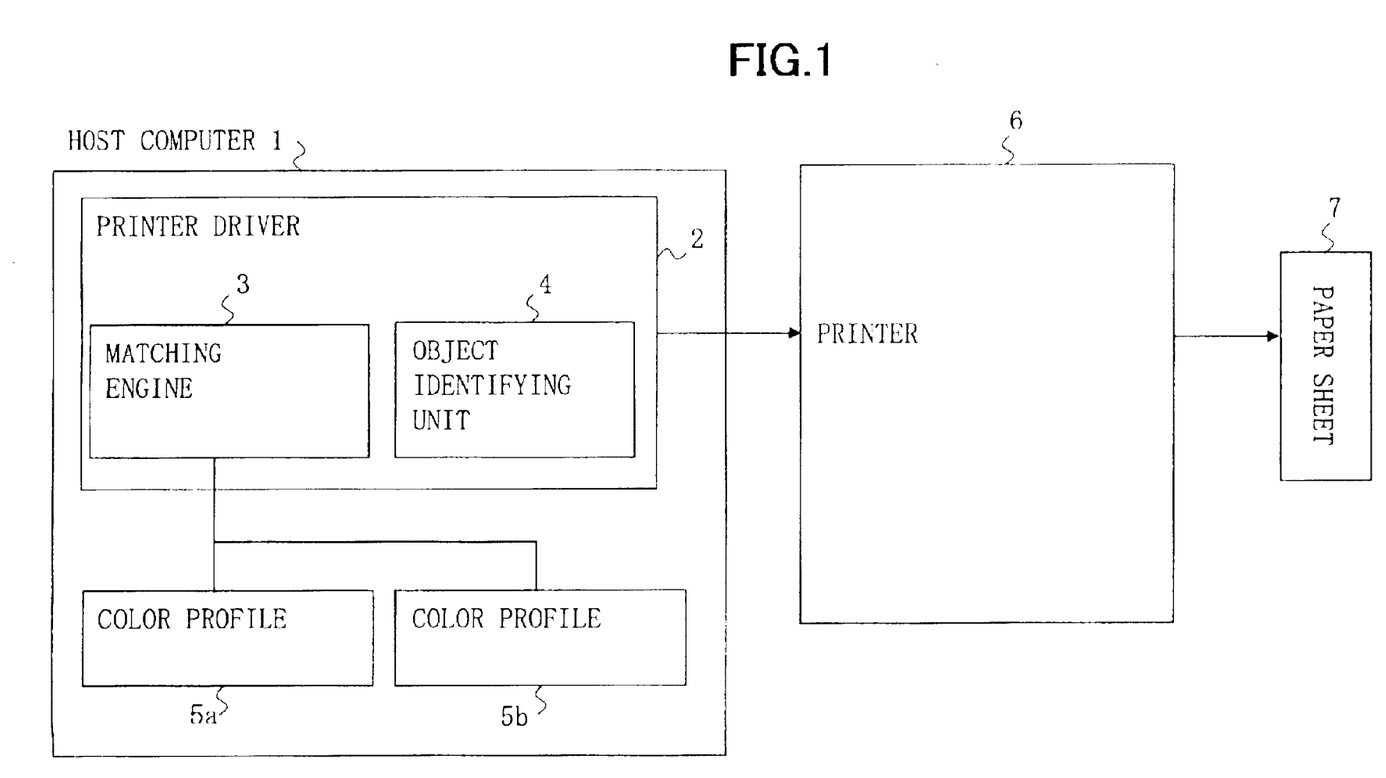
FIG. 1 is a block diagram showing a color printing apparatus according to a first embodiment of the present invention.

FIG. 1 is a block diagram showing a color printing apparatus according to a first embodiment of the present invention. The color printing apparatus includes a host computer 1, a printer driver 2, a matching engine 3, an object identifying unit 4, color profiles 5a and 5b, a printer 6, and a print medium 7.

The color printing apparatus of the first embodiment shown in FIG. 1 includes the host computer 1 and the printer 6. The host computer 1 supplies image data to the printer 6, and the printer 6 prints an image on the print medium 7 such as a paper sheet based on the supplied image data.

The host computer 1 is provided with the printer driver 2 and the color profiles (color matching profiles) 5a and 5b. (Only two profiles are shown for the sake of clarity of illustration, but three or more profiles may be provided in an actual apparatus.) The color profiles 5a and 5b correspond to the respective types of objects in a print document such as letters, marks, lines, graphics, images, etc. The printer driver 2 includes the matching engine 3 that attends to color matching processing by use of a proper color profile selected from the color profiles 5a, and further includes the object identifying unit 4 that identifies the types of objects included in a print document.

The printer driver 2 receives image data of a print document that is generated by application software (not shown). The capture and supply of such image data may be attended to by another system (not shown). The object identifying unit 4 of the printer driver 2 identifies the types of objects included in the supplied image data on object-by-object basis. Based on the identifications, the matching engine 3 selects a color profile from the color profiles 5a and 5b that corresponds to a given object type. The matching engine 3 carries out color matching processing on the objects by using the respective color profiles, thereby producing signals in a proper format and supplying the signals to the printer 6. This processing is performed on an object-by-object basis. In this manner, the image data of the document is sent to the printer 6, and is thereby printed on the print medium 7.

The operation described above is the same as conventional color printer apparatuses. In the first embodiment of the present invention, a color profile for the toner saving purpose (hereinafter referred to a toner-saving-purpose profile) is generated to achieve toner saving.

When the apparatus is set to a toner saving mode, the matching engine 3 converts a selected color profile to a toner-saving-purpose profile after selecting one of the color profiles 5a and 5b that matches an identification given by the object identifying unit 4. The matching engine 3 uses the converted profile to process the object. Such toner saving processing is performed on an object-by-object basis in the toner saving mode, resulting in the density of an image being lowered and the amount of applied toner being reduced.

In the following, a detailed description will be given with regard to the generation of a toner-saving-purpose profile.

Figure 2:
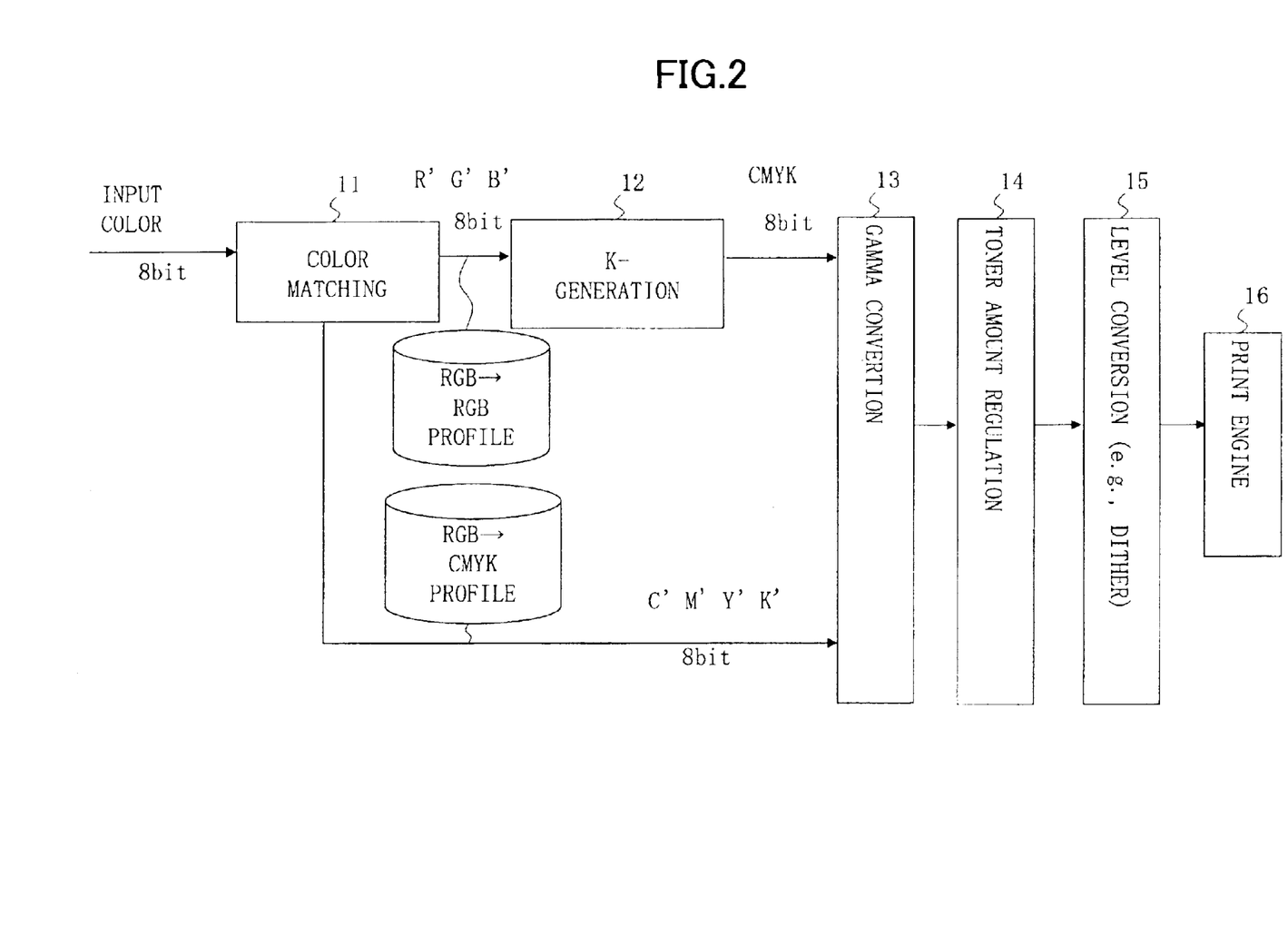
FIG. 2 is an illustrative drawing showing a series of processing steps from the inputting of color data to the printing of a color image.

FIG. 2 is an illustrative drawing showing a series of processing steps from the inputting of color data to the printing of a color image.

As shown in FIG. 2, the series of processing steps includes a color matching step 11, a K-generation step 12, a gamma conversion step 13, a toner amount regulation step 14, a level conversion step 15, and a print engine step 16.

The color matching step 11 receives 8-bit RGB color data, for example, as an input, and converts the color data from the input color space to a desired color space. The desired color space may be a R'G'B' space that is different from the input color space, but is comprised of the same color components R, G, and B as the input color space. The color matching step 11 uses a RGB-to-RGB profile for the purpose of obtaining such a desired color space. The R'G'B' space obtained in this manner will be converted into the CMYK (cyan, magenta, yellow, black) space by the K-generation step 12.

Alternatively, the color matching step 11 may use a RGB-to-CMYK profile to convert the color data directly into a C'M'Y'K' space without using an intervening K-generation step.

Either the color data in the CMYK space or the color data in the C'M'Y'K' space is supplied to the gamma conversion step 13. The gamma conversion step 13 applies gamma conversion to the supplied data, and provides the converted data to the toner amount regulation step 14. The toner amount regulation step 14 regulates a toner amount by performing a toner regulating process such as an under-color removal processing (UCR processing). The image data obtained after the UCR processing is still multi-level image data similar to the original image data input. The level conversion step 15 converts this multi-level image data to binary image data, for example, by applying dither processing, error-diffusion processing, or the like. The binary image is then supplied to the print engine step 16 where it is printed.

Related-art technologies for saving toner are generally carried out near the output end of the series of processing steps. For example, the toner saving scheme that skips print dots by use of a mask pattern needs to be performed after the level conversion step 15 where the image data is represented in binary values.

Unlike the related-art technologies for saving toner, the present invention performs a toner saving process within the color matching step 11. In what follows, a toner saving process within the color matching step 11 will be described in detail.

Figure 3A:
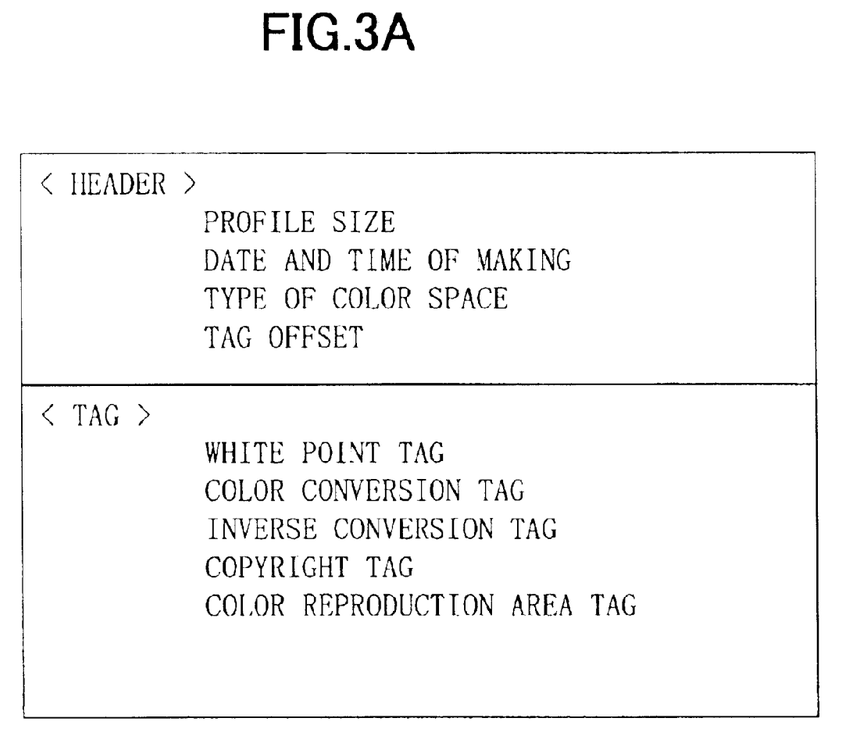
FIGS. 3A and 3B are illustrative drawings showing an example of a color profile.
Figure 3B:
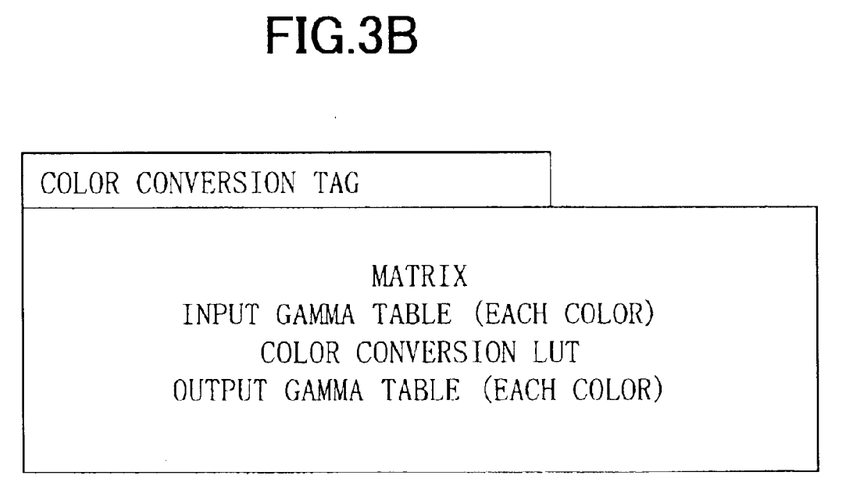

FIGS. 3A and 3B are illustrative drawings showing an example of a color profile. A color profile is used by the matching engine 3 (see FIG. 1) to perform the color matching step 11 (see FIG. 2).

As shown in FIG. 3A, a color profile generally includes a header portion and a tag portion. The header includes data indicative of the profile size, the date and time of making the profile, the type of a color space, and a tag offset. The tag portion includes various tags such as a white point tag, a color conversion tag, an inverse conversion tag, a copyright tag, and a color reproduction area tag. Among these tags, the color conversion tag plays a main role in converting image data from an input color space to another color space.

FIG. 3B shows the contents of the color conversion tag. As shown in FIG. 3B, the color conversion tag includes a matrix, an input gamma table provided for each color, a color conversion LUT (look-up table), and an output gamma table provided for each color. The color conversion LUT lists coordinates in the output color space that correspond to coordinates defined in the input color space. If the input color space is a RGB space, for example, 3-dimensional grid points are defined in the RGB space. If the output color space is also a RGB space, 3-dimensional coordinates in the output color space are listed in the LUT such as to correspond to the respective grid points in the input color space. When input color data is given, grid points around the point of this color data are identified in the input color space, and, then, the LUT is consulted to retrieve LUT entries corresponding to the grid points, followed by interpolating the 3-dimensional coordinates of the retrieved LUT entries to obtain a point in the output color space that corresponds to the point in the input color space.

Figure 4:
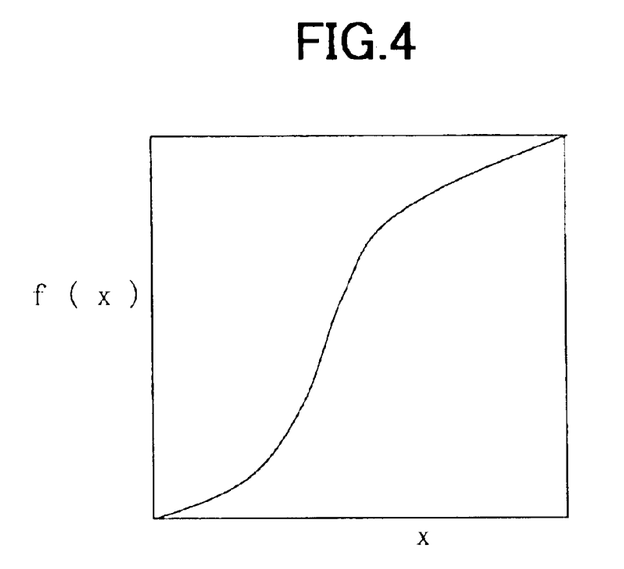
FIG. 4 is an example of a gamma table, which may be either an input gamma table or an output gamma table.

As shown in FIG. 3B, the color conversion process based on the use of the color conversion LUT is accompanied by the input gamma table and the output gamma table. FIG. 4 is an example of a gamma table, which may be either the input gamma table or the output gamma table. In FIG. 4, an input value x is converted into an output value f(x) where the function f(x) has a characteristic curve as shown in the figure.

Figure 5:
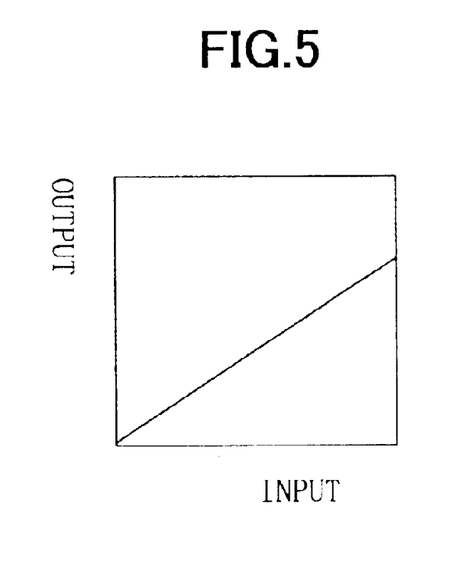
FIG. 5 is an illustrative drawing showing an example of a toner saving characteristic curve.

The first embodiment of the present invention multiplies the gamma conversion function f(x) by a toner saving characteristic curve. FIG. 5 is an illustrative drawing showing an example of the toner saving characteristic curve. In this example, input values are mapped onto a limited output range that covers only a portion of the entire range of possible output values. Through multiplication by the toner saving characteristic curve, the gamma conversion function f(x) is converted into a toner-saving gamma conversion function that also has a limited range of output values.

In the first embodiment of the present invention, the matching engine 3 (FIG. 1) operating in the toner saving mode converts a selected color profile to a toner-saving-purpose profile after selecting one of the color profiles 5a and 5b that matches the identified type of the object. The matching engine 3 then applies the color matching step 11 (FIG. 2) to the input color data by using the toner-saving-purpose profile in which the input or output gamma conversion function as shown in FIG. 4 is converted by the toner saving characteristic curve as shown in FIG. 5. In this manner, the toner saving process is performed as part of the color matching step 11, without sacrificing the processing speed as in the related-art case where the toner-saving process step needs to be added after the level conversion step 15 of FIG. 2.

It should be noted that the object identifying unit 4 is not essential to carry out the toner saving process according to the present invention. That is, even if only one color profile is provided for use for all types of objects, the toner saving process can be performed as part of the color matching step according to the present invention.

When a toner saving process is implemented simply through manipulation of a characteristic curve between input values and output values as described above, slight color displacement may take place that may results in a reproduced image being printed in color tones that do not match user expectations. In order to avoid this, it is preferable to manipulate the color conversion LUT of a color profile. Since converting the color conversion LUT involves a lot of computation, a color conversion LUT for the toner saving purpose may preferably be provided in advance as a toner-saving-purpose profile, which is then selected at the time of actual color conversion in response to the indication of the toner saving mode.

In the following, a description will be given with regard to the use of a toner-saving-purpose profile that is prepared in advance.

Figure 6:
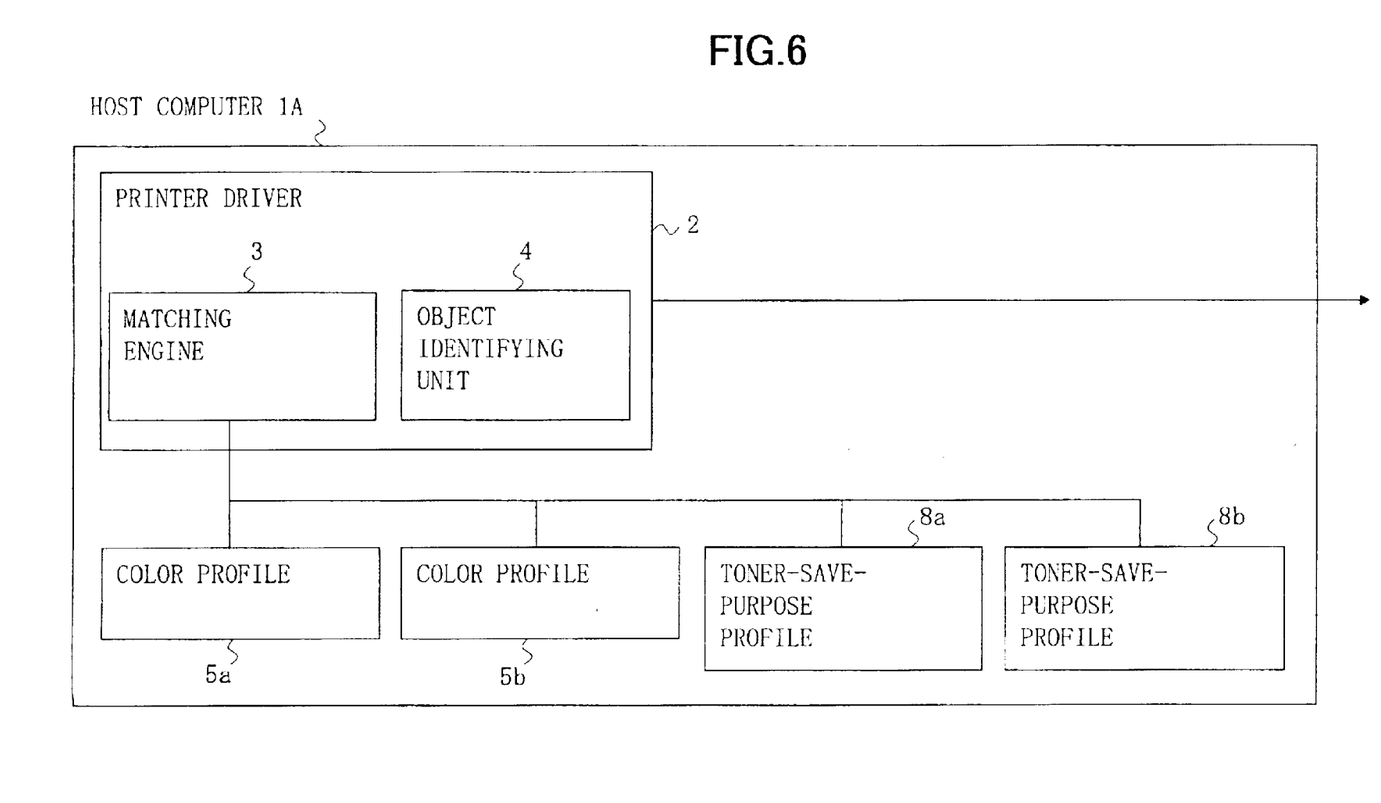
FIG. 6 is a block diagram showing a main part of the color printing apparatus according to a second embodiment of the present invention.

FIG. 6 is a block diagram showing a main part of the color printing apparatus according to a second embodiment of the present invention. In FIG. 6, the same elements as those of FIG. 1 are referred to by the same numerals, and a description thereof will be omitted. As shown in FIG. 6, a host computer 1A includes all the elements of the host computer 1, and further includes toner-saving-purpose profiles 8a and 8b.

In the second embodiment, the toner-saving-purpose profiles are not generated from the color profiles 5a and 5b at the time of printing, but are created in advance to correspond to respective object types. Here, the color profiles 5a and the toner-saving-purpose profile 8a are directed to the same object type, and the color profiles 5b and the toner-saving-purpose profile 8b also belong to the same object type.

In the second embodiment, a mode selecting means is used to select one of the normal mode and the toner saving mode, and an object selecting means is used to select one or more object types for which toner saving is carried out. Use of these means makes it possible to reduce a toner amount for the printing of a selected object type.

An object type corresponding to the color profile 5a is referred to as an object A, and an object type corresponding to the color profile 5b is identified as an object B. The toner mode is selected by use of the mode selecting means, and the object B corresponding to the color profile 5b is selected by the object selecting means. When the object identifying unit 4 in the printer driver 2 identifies an object included in the input image data as the object A, the matching engine 3 selects the color profile 5a to process this object. When the object identifying unit 4 identifies an object included in the input image data as the object B, on the other hand, the matching engine 3 selects the toner-saving-purpose profile 8b to process this object. In this manner, the object A is printed to be a high quality image, whereas the object B is printed with a reduced toner amount.

Figure 7:
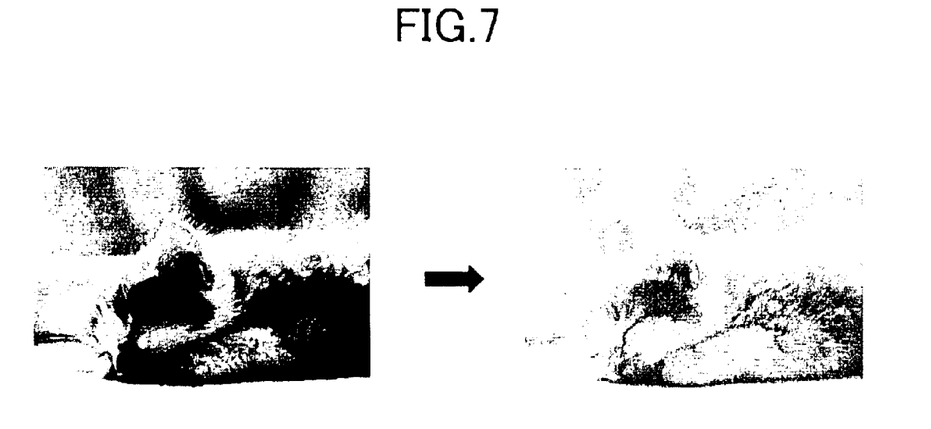
FIG. 7 is a drawing showing an example of a print image that is produced by using a toner-saving-purpose profile having increased lightness.

An example of a toner-saving-purpose profile would be a color profile that has increased lightness while the two other color components, i.e., chroma and hue, remain unchanged from the original color profile. FIG. 7 is a drawing showing an example of a print image that is produced by using the toner-saving-purpose profile having increased lightness. The image on the left-hand side is a print image produced by using a normal color profile, and the image on the right-hand side is a print image obtained by employing the toner-saving-purpose profile. As is shown, the image of the toner saving mode has a brighter appearance (i.e., lower density) than the image of high-quality printing that does not suppress the toner amount.

Figure 8:
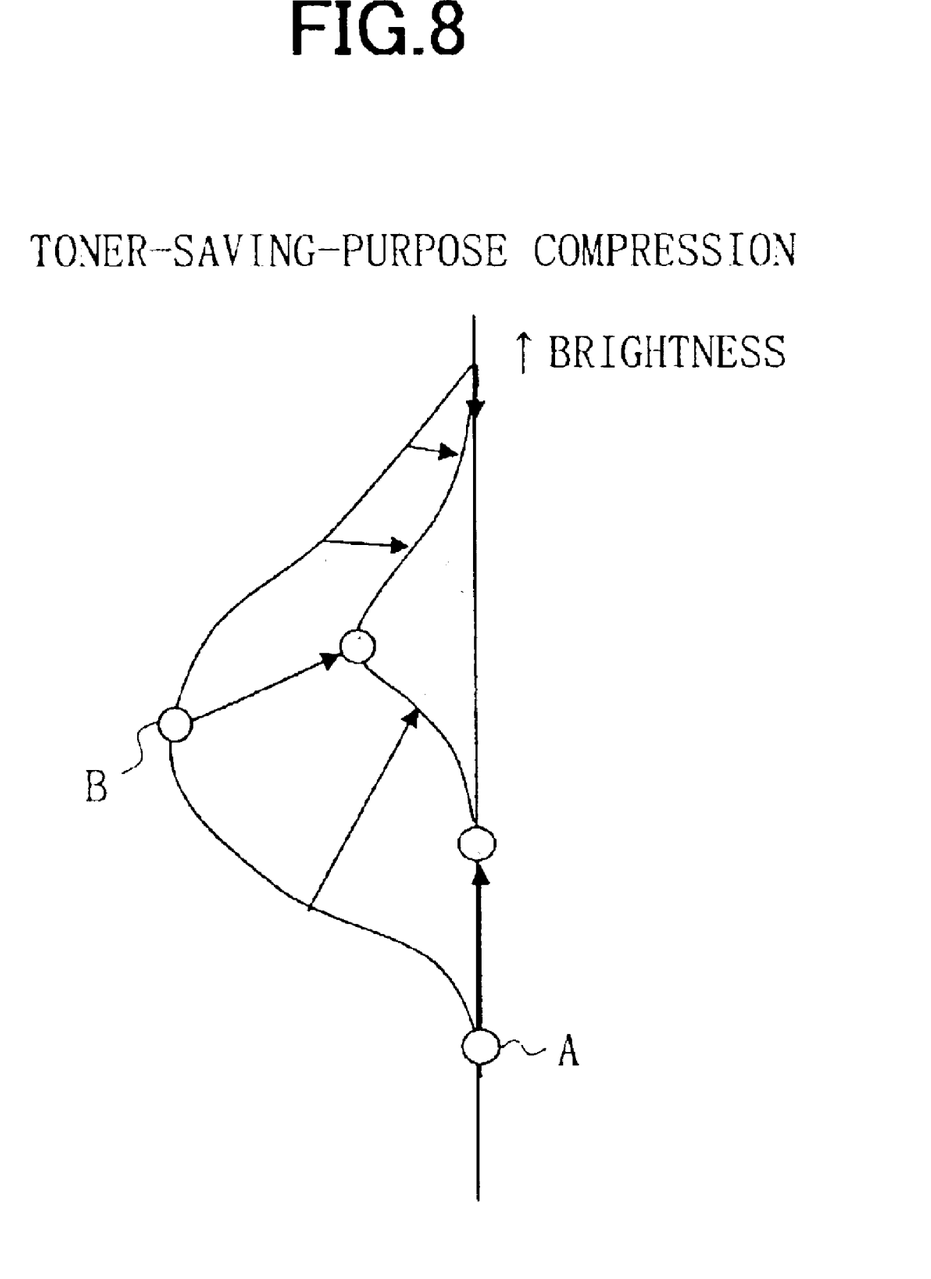
FIG. 8 is an illustrative drawing for explaining the generation of the toner-saving-purpose profile that has increased lightness.

FIG. 8 is an illustrative drawing for explaining the generation of a toner-saving-purpose profile that has increased lightness.

In FIG. 8, the vertical axis represents lightness (brighter toward the top and darker toward the bottom), and the profile represents chroma in the horizontal direction. This profile represents a cross section that is taken along an equal hue plane through the color solid. As shown in FIG. 8, a toner-saving-purpose profile is created by converting a color profile such that the darkest point A is shifted up to a lighter point, the highest chroma point shifted up to a lighter point, and chroma lowered across the board.

The color conversion as described above insures that lightness is increased without changing hue. Such color conversion is applied to each of the color profiles provided in the host computer 1. In this example, the two color profiles 5a and 5b are given, so that the two toner-saving-purpose profiles 8a and 8b are created by applying the color conversion as described above to the respective color profiles 5a and 5b. Namely, the color conversion LUTs of the color profiles 5a and 5b are modified according to the color conversion scheme as shown in FIG. 8, thereby creating the toner-saving-purpose profiles 8a and 8b, respectively.

An image printed by using the toner-saving-purpose profiles generated in this manner has a brighter appearance over the entire image while avoiding any change in color tone. In order to increase lightness, here, the LUT entry coordinates may be changed such that (R, G, G)=(0, 0, 255) is changed to (R, G, B)=(80, 80, 255), for example.

In this manner, toner-saving-purpose profiles can be created from color profiles through simple color conversion, and can be applied to the respective object types in the same manner as the color profiles are applied to. This makes it possible to achieve discriminatory toner saving for different image parts without reducing the processing speed of color printing. Namely, toner saving can be achieved with respect to only a selected portion of the print image while maintaining high image quality for portions that require such quality printing.

Moreover, two or more toner-saving-purpose profiles may be created in relation to the same color profile so as to achieve different toner saving amounts. In such a case, a user is given a choice to select one of the different toner saving amounts, and the selected toner-saving-purpose profile is used upon user selection.

Further, two or more object types may be selected by the user so that toner saving is carried out with respect to the selected object types. Object types that are of less significance and thus properly printed in fainter tones may thus be selected by the user as toner-saving objects. If no selection is made by the user despite an explicit indication of the toner saving mode, selection of all the objects may constructively be made, so that toner saving printing is performed on all the objects.

It should be noted that the object identifying unit 4 is not essential to carry out the toner saving process according to the present invention. That is, even if only one color profile is provided for use for all the types of objects, the toner saving process can be performed as part of the color matching step according to the present invention.

In the description provided above, the object selecting means may alternatively be provided as a means to select one or more object types that require high quality printing, rather than as a means to select toner-saving object types. In such a case, all the object types that are not selected will be printed through toner-saving processes.

A certain type of color printing apparatus is conventionally available that has a predetermined set of print quality levels to be applied to respective document types. A print function of the printer driver allows a user to select a document type, which results in a print image having a print quality level corresponding to the selected document type. This effectively prevents the user from making detailed settings to the print quality.

A color printing apparatus according to a third embodiment of the present invention is directed to a configuration in which the toner saving function of the second embodiment is applied to the color printing apparatus as described above. This allows the selection of a document type by a user to results in a print image having a print quality level corresponding to the selected document type wherein objects of less significance are printed with reduced toner amounts.

Figure 9A:
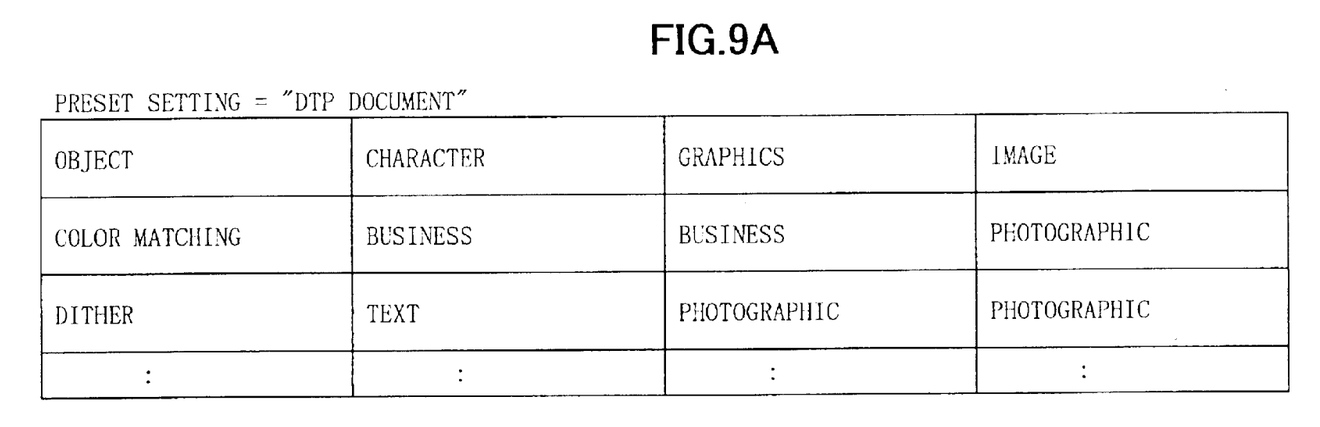
FIGS. 9A and 9B are tables showing preset settings that are used to print a certain type of a document.
Figure 9B:
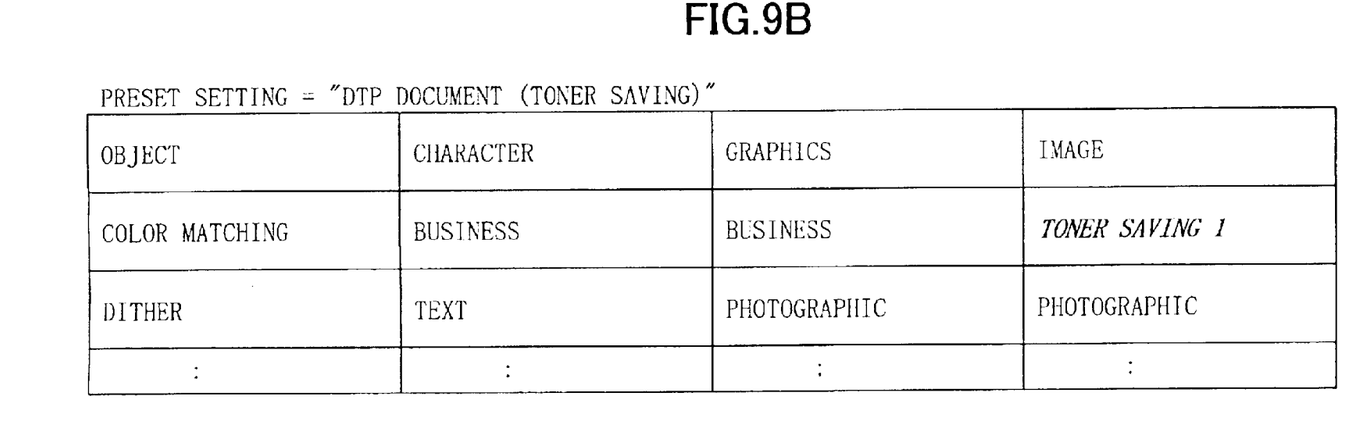

FIGS. 9A and 9B are tables showing preset settings that are used to print a certain type of a document.

FIG. 9A shows settings that are used in color matching processing and dither processing when a document type referred to as a DTP (desktop publishing) document is printed. There are three types of objects, i.e., "character", "graphics", and "image". When the color matching process is performed, a color profile "BUSINESS" is used for characters and graphics whereas a color profile "PHOTOGRAPHIC" is used for images. When the dither processing is performed, a dither matrix "TEXT" is used for characters, whereas a dither matrix "PHOTOGRAPHIC" is used for graphics and images. These are color profiles and dither matrixes that are considered by the manufacturer to be proper to be applied to the identified document type "DTP DOCUMENT".

In the conventional art, the set of settings as shown in FIG. 9A is used to print a document. In the third embodiment, this set of settings is provided for use in the normal mode, and another set of settings is further provided for use in the toner saving mode so as to print objects of less significance by use of the toner saving functions.

FIG. 9B shows an example of settings that are used to print the DTP document in the toner saving mode. In this set of settings, the object type "image" in the color matching processing is regarded as being less significant in terms of use of colors, so that a toner-saving-purpose profile "TONER SAVING 1" is selected from the toner-saving-purpose profiles that correspond to different toner saving amounts. In the toner saving mode, therefore, the object type "image" is processed and printed by use of the profile "TONER SAVING 1".

In this manner, object types that do not require high print quality may be assigned to toner-saving-purpose profiles, so that these objects are subjected to toner saving in the toner saving mode while other objects are subjected to high quality printing. This achieves discriminatory toner saving while maintaining desired print quality.

Figure 10:
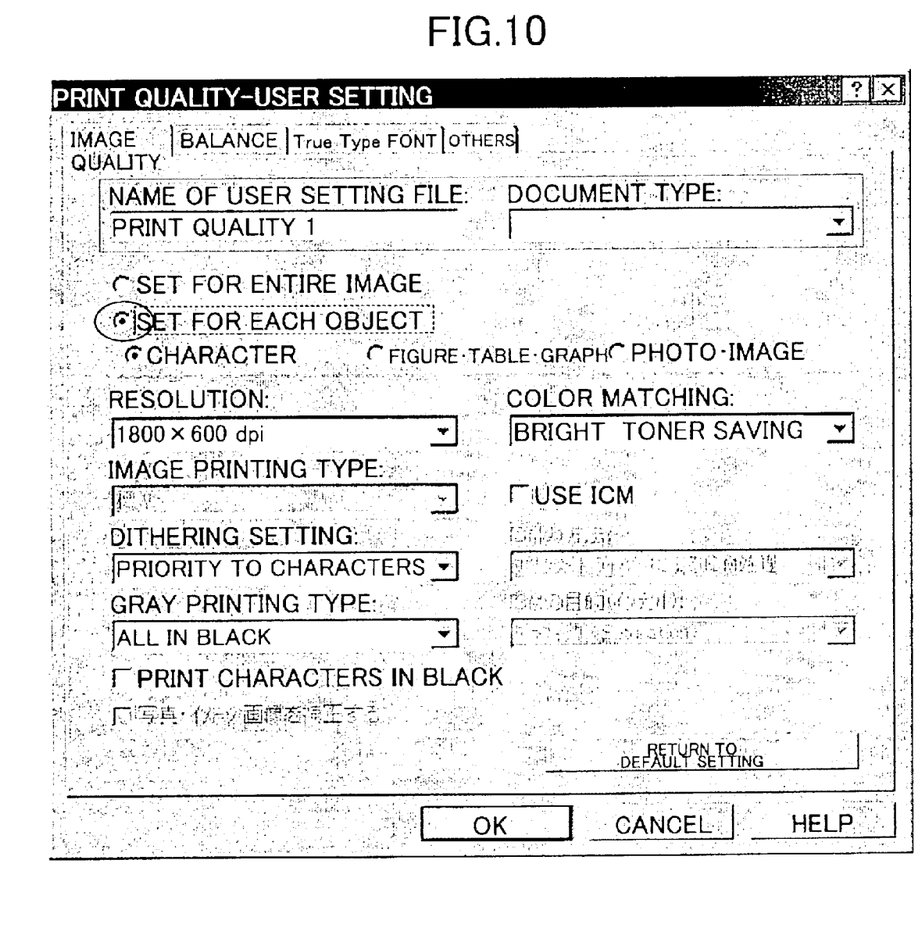
FIG. 10 is an example of a window displayed on a screen of a host computer.

FIG. 10 is an example of a window displayed on the screen of the host computer 1. This window is presented when the user wishes to use the toner saving function in relation to the second embodiment of the present invention.

In the window shown in FIG. 10, the user selects "SET FOR EACH OBJECT", and further selects "CHARACTER" as the object for which the user is to make a setting. For the selected object "CHARACTER", the user chooses a toner-saving-purpose profile "BRIGHT TONER SAVING". As a result, the toner-saving-purpose profile "BRIGHT TONER SAVING" will be used for the object type "CHARACTER" when a document is printed.

In this manner, the window as shown in FIG. 10 serves as both the mode selecting means and the object selecting means in that the selection of a toner-saving-purpose profile for a particular object results in the selection of the toner saving mode for the selected object.

Figure 11:
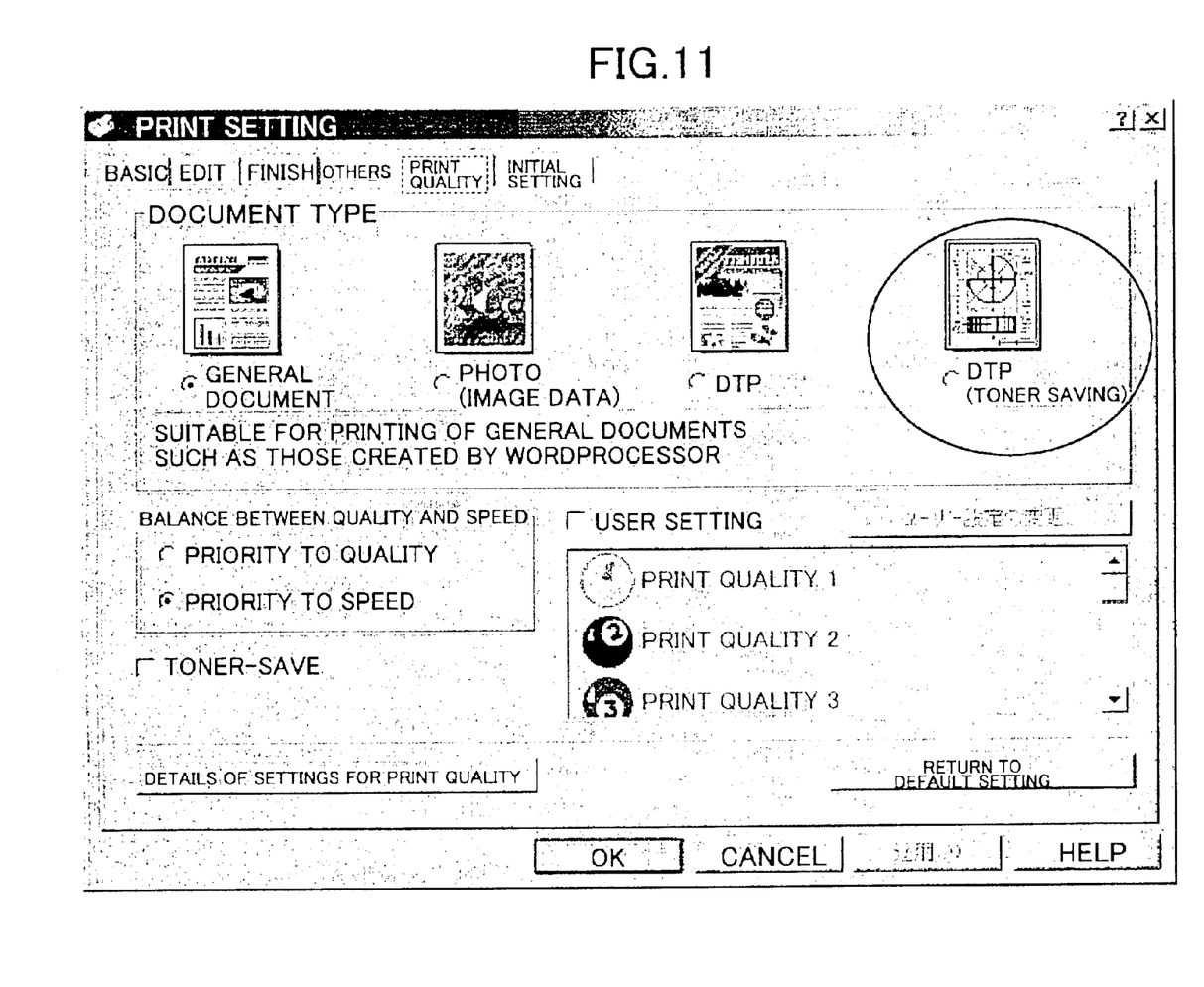
FIG. 11 is an example of a window displayed on the screen of the host computer.

FIG. 11 is an example of a window displayed on the screen of the host computer 1. This window is presented when the user wishes to use the toner saving function in relation to the third embodiment of the present invention.

In the window shown in FIG. 11, the user is given a choice between "GENERAL DOCUMENT", "PHOTOGRAPH", "DTP", and "DTP (TONER SAVING)". If the user selects the document type "DTP (TONER SAVING)", the set of settings as shown in FIG. 9B will be used when printing a document of the document type "DTP DOCUMENT". If the user selects the document type "DTP", the set of settings as shown in FIG. 9A will be used when printing a document of the document type "DTP DOCUMENT".

The above embodiments have been described with reference to a configuration in which the matching engine 3 and the color profiles 5a and 5b are situated in the host computer 1. Alternatively, the matching engine 3 and the color profiles 5a and 5b may be provided in the printer 6.

Figure 12:
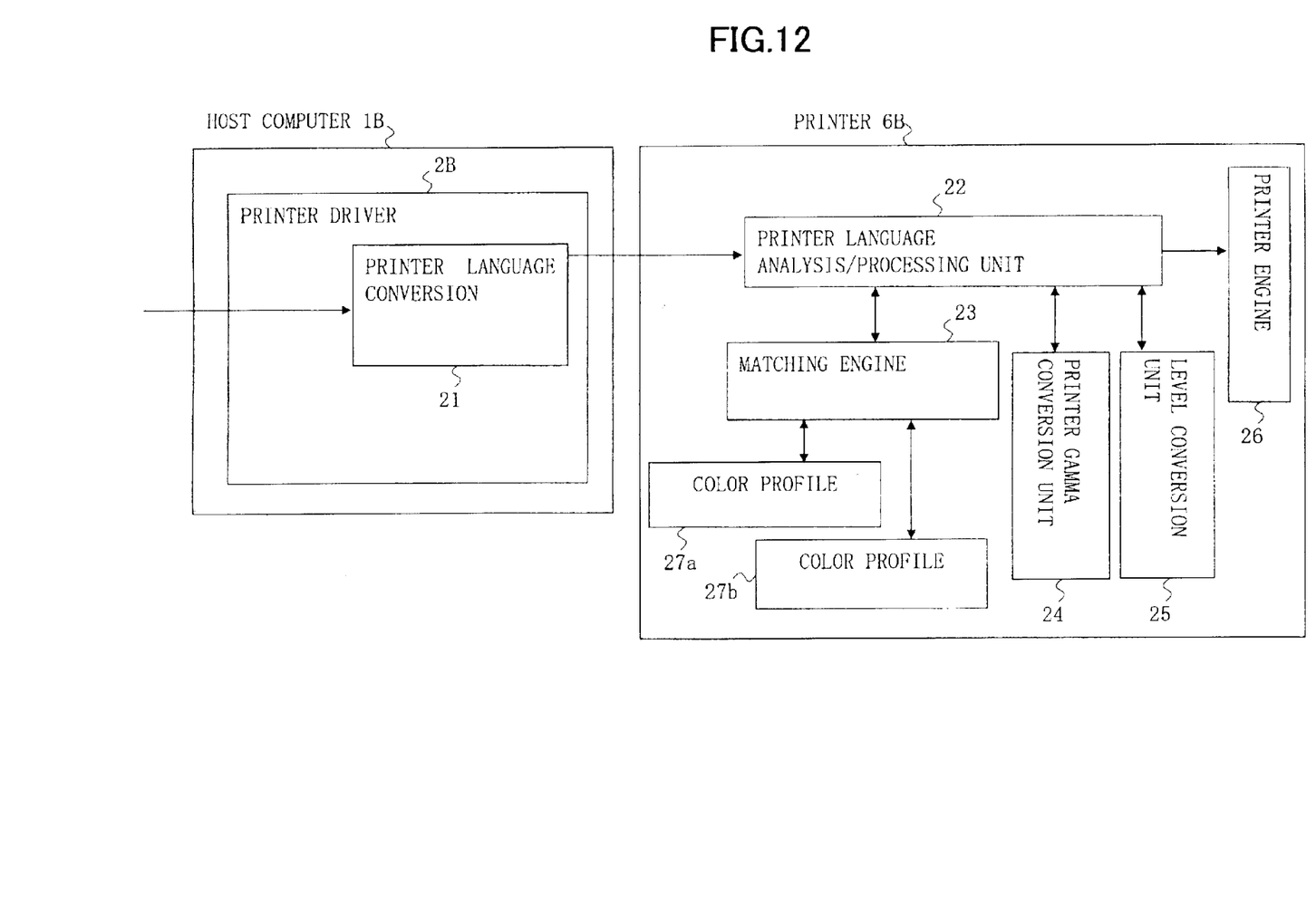
FIG. 12 is a block diagram showing the configuration of a variation of a color printing apparatus according to the present invention.

FIG. 12 is a block diagram showing the configuration of a variation of a color printing apparatus according to the present invention.

The color printing apparatus of FIG. 12 includes a host computer 1B and a printer 6B. The host computer 1B supplies image data to the printer 6B, and the printer 6B prints an image on a paper sheet or the like. The host computer 1B includes a printer engine 2B. The printer engine 2B includes a printer language conversion unit 21, which converts data in the host-computer graphic language into data in the printer language. The data represented in the printer language is then supplied to the printer 6B.

The printer 6B includes a printer language analysis/processing unit 22, a matching engine 23, a printer gamma conversion unit 24, a level conversion unit 25, a printer engine 26, and color profiles 27a and 27b. The printer language analysis/processing unit 22 analyzes the data supplied from the host computer 6B, and processes the data by use of the matching engine 23, the printer gamma conversion unit 24, and the level conversion unit 25, followed by supplying the processed data to the printer engine 26 for printing of the data. The matching engine 23 carries out the color matching process as described in connection with the first through third embodiments. The printer gamma conversion unit 24 performs gamma conversion, and the level conversion unit 25 converts multi-level data into binary data, for example.

The color profiles 27a and 27b correspond to the color profiles 5a and 5b used in the first through third embodiments. As in the first embodiment, a toner-saving-purpose profile may be made from the color profiles 5a and 5b at the time of printing a document image. Alternatively, as in the second embodiment, a toner-saving-purpose profile may be made in advance from the color profiles 5a and 5b and stored in memory, thereby allowing the use of the toner-saving-purpose profile to be used at the time of printing.

In this manner, the location of the matching engine and the color profiles, whether they are located in the host computer or located in the printer, does not matter in terms of achieving the toner saving function according to the present invention.

Figure 13:
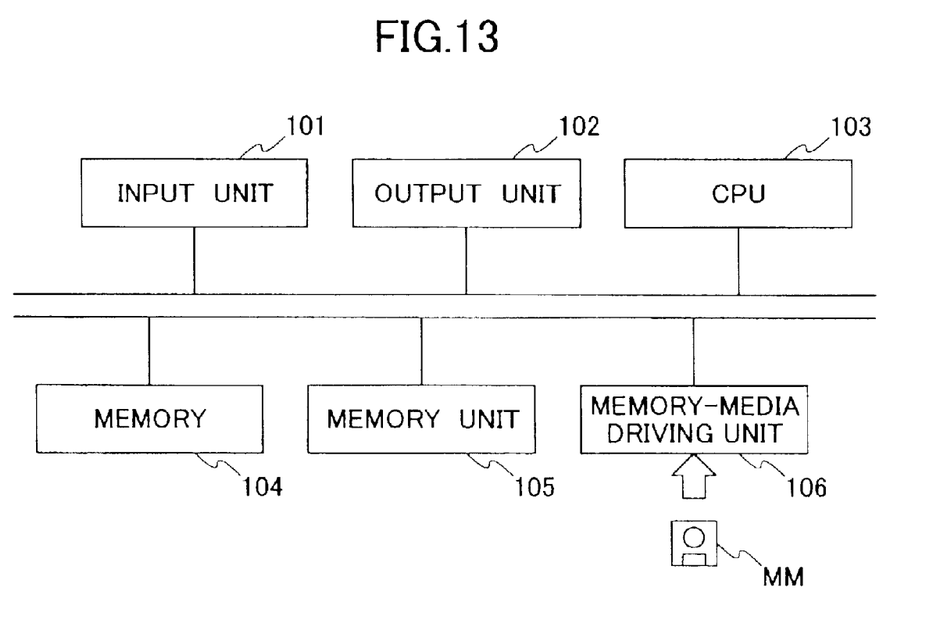
FIG. 13 is a block diagram showing an example of the configuration of the host computer used in the present invention.

FIG. 13 is a block diagram showing an example of the configuration of the host computer used in the present invention.

The host computer of FIG. 13 includes an input unit 101, an output unit 102, a CPU 103, a memory 104, a memory unit 105, and a memory-media driving unit 106.

The printer driver 2 of FIG. 1 is provided as a computer program executable by the computer 1. This computer program is typically provided through a memory medium MM, which comes with the printer 6 at the time of purchase. The user insert the memory medium MM into the memory-media driving unit 106 to load the computer program from the memory medium MM to the memory 104 such as a RAM or to the memory unit 105 such as a hard drive unit. Alternatively, the computer program may be stored in a memory medium at a remote site (not shown), and is loaded to the memory 104 or to the memory unit 105 from this remote-site memory medium through a network. Alternatively, the computer 1 may be provided with this computer program preinstalled in the memory unit 105.

The CPU 103 uses an available memory space of the RAM (memory 104) as a work area to execute the program loaded to the RAM, and proceeds by interacting with the user as necessary. By executing the program, the computer 1 controls the printer 6 through the output unit 102 (i.e., interface) to print a document. A toner-saving-purpose profile may be generated by the program from an existing color profile at the time of printing as described in connection with the first embodiment, or may be generated from an existing color profile in advance and stored in the memory 104 or in the memory unit 105 for later use thereof. Alternatively, a toner-saving-purpose profile may be provided as part of a preset data set provided by the manufacturer of the printer 6.

In the case of the configuration as shown in FIG. 12, the printer 6B may includes the same elements as those shown in FIG. 13, and operates in the same manner as the computer described above. The memory-media driving unit 106 may be provided as part of the printer 6B, or may be part of the host computer 1, whatever the case may be.

Further, the present invention is not limited to these embodiments, but various variations and modifications may be made without departing from the scope of the present invention.

What is claimed is:

1. An apparatus, comprising:
   a printer driver which processes input image data; and
   one or more color profiles which are used by said printer driver to perform color matching on the input image data in a normal mode, wherein said printer driver uses one or more toner-saving-purpose profiles to perform color matching on the input image data in a toner saving mode, said one or more toner-saving-purpose profiles being designed to reduce a toner amount on a printed color image,
   wherein said printer driver includes an object identifying unit which identifies a type of an object included in the input image data, wherein said printer driver selects one of the toner-saving-purpose profiles that matches the identified type of the object so as to use the selected toner-saving-purpose profile to perform the color matching in the toner saving mode.

2. The apparatus as claimed in claim 1, wherein said printer driver generates said one or more toner-saving-purpose profiles at a time of printing the color image.

3. The apparatus as claimed in claim 2, wherein said printer driver generates the one or more toner-saving-purpose profiles by converting a characteristic curve of a gamma conversion table of the one or more color profiles.

4. The apparatus as claimed in claim 1, wherein said one or more toner-saving-purpose profiles are provided in advance, and are then stored in memory for later use that is at a time of printing the color image.

5. The apparatus as claimed in claim 4, wherein said one or more toner-saving-purpose profiles are generated by converting a color conversion look-up table of the one or more color profiles in such a manner as to maintain original hue.

6. The apparatus as claimed in claim 1, wherein the printer driver allows a user to determine whether a given object type is subjected to toner saving on object-type-by-object-type basis.

7. The apparatus as claimed in claim 1, further includes a preset setting table that indicates which profiles are to be used on respective object types, wherein said preset setting table includes at least one toner-saving-purpose profile.

8. A method of processing input image data, comprising the steps of:
applying one or more color profiles to perform color matching on the input image data in a normal mode;
applying one or more toner-saving-purpose profiles to perform color matching on the input image data in a toner saving mode, said one or more toner-saving-purpose profiles being designed to reduce a toner amount on a printed color image;
identifying a type of an object included in the input image data; and
selecting one of the toner-saving-purpose profiles that matches the identified type of the object so as to use the selected toner-saving-purpose profile to perform the color matching in the toner saving mode.

9. The method as claimed in claim 8, further comprising a step of generating said one or more toner-saving-purpose profiles at a time of printing the color image by converting a characteristic curve of a gamma conversion table of the one or more color profiles.

10. The method as claimed in claim 8, further comprising a step of providing said one or more toner-saving--purpose profiles in advance before a time of printing the color image by converting a color conversion look-up table of the one or more color profiles an such a manner as to maintain original hue.

11. A record medium having a program embodied therein for causing a processing unit to process input image data, said program comprising the steps of:
applying one or more color profiles to perform color matching on the input image data an a normal mode;
applying one or more toner-saving-purpose profiles to perform color marching on die input image data in a toner saving mode, said one or more toner-saving-purpose profiles being designed to reduce a toner amount on a printed color image;
identifying a type of an object included in the input image data; and
selecting one of the toner-saving-purpose profiles that matches the identified type of the object so as to use the selected toner-saving-purpose profile to perform the color matching in the toner saving mode.

12. The record medium as claimed in claim 11, wherein said program further comprises a step of generating said one or more toner-saving-purpose profiles at a time of printing the color image by converting a characteristic curve of a gamma conversion table of the one or more color profiles.

13. The record medium as claimed in claim 11, wherein said program further comprises a step of providing said one or more toner-saving-purpose profiles in advance before a time of printing the color image by converting a color conversion look-up table of the one or more color profiles in such a manner as to maintain original hue.

14. An apparatus, comprising:
a printer driver which processes input image data; and
one or more toner-saving-purpose profiles used by the printer driver to perform color matching on the input image data, said one or more toner-saving-purpose profiles being designed to reduce a toner amount on a printed color image,
wherein said printer driver includes an object identifying unit which identifies a type of an object included in the input image data, wherein said printer driver selects one of the toner-saving-purpose profiles that matches the identified type of the object so as to use the selected toner-saving-purpose profile to perform the color matching.

15. An apparatus, comprising:
first means for processing input image data;
second means for storing one or more toner-saving-purpose profiles, said first means using the one or more toner-saving-purpose profiles to perform color matching on the input image data, said one or more toner-saving-purpose profiles being designed to reduce a toner amount on a printed color image; and
an object identifying means for identifying a type of an object included in the input image data,
wherein said first means selects one of the toner-saving purpose profile that matches the identified type of the object so as to use the selected toner-saving-purpose profile to perform the color matching.

16. An apparatus, comprising:
one or more toner-saving-purpose profiles configured to be used in color matching on input image data, said one or more toner-saving-purpose profiles being designed to reduce a toner amount on a printed color image;
an object identifying unit which identifies a type of an object included in the input image data; and
a selecting unit which selects one of the toner-saving-purpose profiles that matches the identified type of the object so as to use the selected toner-saving-purpose profile to perform the color matching.

17. A method of processing input image data, comprising the steps of:
applying one or more color profiles to perform color matching on the input image data in a normal mode;
applying one or more toner-saving-purpose profiles to perform color matching on the input image data in a toner saving mode, said one or more toner-saving-purpose profiles being designed to reduce a toner amount on a printed color image; and
generating said one or more toner-saving-purpose profiles by converting a color conversion look-up table of the one or more color profiles in such a manner that a darkest point is shifted up to a lighter point, a highest chroma point shifted up to a lighter point, and chroma lowered over an entire lightness range, within an equal hue plane such as to maintain original hue.

18. A record medium having a program embodied therein for causing a processing unit to process input image data, said program comprising the steps of:

applying one or more color profiles to perform color matching on the input image data in a normal mode;

applying one or more toner-saving-purpose profiles to perform color matching on the input image data in a toner saving mode, said one or more toner-saving-purpose profiles being designed to reduce a toner amount on a printed color image; and generating said one or more toner-saving-purpose profiles by converting a color conversion look-up table of the one or more color profiles in such a manner that a darkest point is shifted up to a lighter point, a highest chroma point shifted up to a lighter point, and chroma lowered over an entire lightness range, within an equal hue plane such as to maintain original hue.

19. An apparatus, comprising:

a printer driver which processes input image data; and one or more toner-saving-purpose profiles used by the printer driver to perform color matching on the input image data, said one or more toner-saving-purpose profiles being designed to reduce a toner amount on a printed color image, wherein said one or more toner-saving-purpose profiles are generated by converting a color conversion look-up table of the one or more color profiles in such a manner that a darkest point is shifted up to a lighter point, a highest chroma point shifted up to a lighter point, and chroma lowered over an entire lightness range, within an equal hue plane such as to maintain original hue.

20. An apparatus, comprising:

first means for processing input image data;

second means for storing one or more toner-saving-purpose profiles, said first means using the one or more toner-saving-purpose profiles to perform color matching on the input image data, said one or more toner-saving-purpose profiles being designed to reduce a toner amount on a printed color image, wherein said one or more toner-saving-purpose profiles are generated by converting a color conversion look-up table of the one or more color profiles in such a manner that a darkest point is shifted up to a lighter point, a highest chroma point shifted up to a lighter point, and chroma lowered over an entire lightness range, within an equal hue plane much as to maintain original hue.

21. An apparatus, comprising:

a processing unit which processes input image data; and one or more toner-saving-purpose profiles used by the processing unit to perform color matching on the input image data, said one or more toner-saving-purpose profiles being designed to reduce a toner amount on a printed color image, wherein said one or more toner-saving-purpose profiles are generated by converting a color conversion look-up table of the one or more color profiles in such a manner that a darkest point is shifted up to a lighter point, a highest chroma point shifted up to a lighter point, and chroma lowered over an entire lightness range, within an equal hue plane such as to maintain original hue.

22. An apparatus, comprising:

a printer driver which processes input image data; and one or more color profiles which are used by said printer driver to perform color matching on the input image data in a normal mode, wherein said printer driver uses one or more toner-saving-purpose profiles to perform color matching on the input image data in a toner saving mode, said one or more toner-saving-purpose profiles being designed to reduce a toner amount on a printed color image, wherein said one or more toner-saving-purpose profiles are generated by converting a color conversion look-up table of the one or more color profiles in such a manner that a darkest point is shifted up to a lighter point, a highest chroma point shifted up to a lighter point, and chroma lowered over an entire lightness range, within an equal hue plane such as to maintain original hue.

\* \* \* \* \*